United States Patent Office 3,350,278
Patented Oct. 31, 1967

3,350,278
ENZYMATIC GLUCOSE TEST COMPOSITION AND DEVICE
Neil B. C. Gretton and James T. Rees, Bridgend, Glamorgan, South Wales, and William Bradley, Paignton, England, assignors to Miles Laboratories Incorporated, Elkhart, Ind., a corporation of Indiana
No Drawing. Filed Dec. 2, 1963, Ser. No. 327,539
Claims priority, application Great Britain, Dec. 3, 1962, 45,652/62
10 Claims. (Cl. 195—127)

ABSTRACT OF THE DISCLOSURE

Enzymatic glucose-testing composition and device utilizing glucose oxidase, a substance having peroxidase activity and as an indicator, an anil compound having the formula

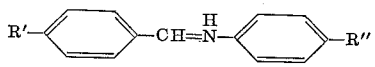

where R' and R" are the same or different and are each a hydroxyl or amino radical or a NHR or $NR_2$ radical where R is an alkyl or aryl radical and wherein the benzene rings may contain further substituents such as alkoxy groups, and salts thereof. The device preferably utilizes a bibulous material as a carrier for the above described composition.

---

This invention relates to the detection of glucose and more particularly to improved glucose-testing compositions and devices.

While the compositions and test devices of the present invention are useful in the determination of the glucose content of a wide variety of materials, one of the most important applications is in the detection of glucose in body fluids such as urine. The determination of glucose in urine is, of course, of importance not only to diabetic patients who must control their sugar input, but is essentially involved where large numbers of people are screened to determine the incidence of diabetes among them.

A composition has been proposed in our United Kingdom specification No. 808,742 for detecting glucose in urine, which comprises glucose oxidase, peroxidase, an indicator which is oxidized by hydrogen peroxide and undergoes a colour reaction during such oxidation, for example o-tolidine or benzidine. It is stated that the composition may also contain a buffer for maintaining the pH of the mixture between about 2 and about 8 in the presence of urine and a protein or a protein degradation product.

However, both o-tolidine and benzidine are harmful materials to handle in bulk. It has now been found according to the invention that these indicators may be replaced by other substances free from these defects and which still give satisfactory results in detecting glucose in urine.

Accordingly, the present invention provides a composition for detecting glucose in urine which comprises glucose oxidase, a substance having peroxidase or peroxidase-like activity and an indicator which is oxidized by hydrogen peroxide and peroxidase and undergoes a colour reaction during such oxidation, said indicator being of the general formula:

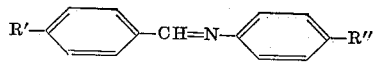

where R' and R" are the same or different and are each a hydroxyl or amino radical or a NHR or $NR_2$ radical where R is an alkyl or aryl radical and wherein the benzene rings may contain further substituents, e.g., alkoxy groups and salts thereof.

One example of an indicator which may be used is the anil obtained by the condensation of vanillin with p-aminodimethylaniline hydrochloride, which give an off-white product of the formula:

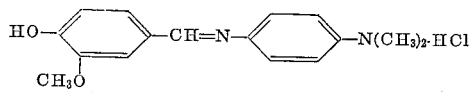

This substance changes in colour to mauve in the presence of glucose in weakly acid solutions.

A second example of an indicator which may be used is the anil obtained by the condensation of p-dimethylaminobenzaldehyde with p-aminophenol which gives a yellow product of the formula:

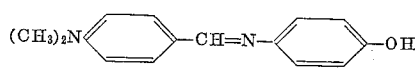

This substance changes in colour to brown in the presence of glucose in weakly acid solution.

A third example of an indicator which may be used is the anil obtained by the condensation of p-hydroxybenzaldehyde with p-aminophenol which gives a yellow product of the formula:

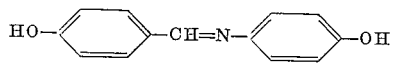

This substance changes in colour to brown in the presence of glucose in weakly acid solution.

The composition preferably contains a buffer for maintaining the pH of the mixture between 2 and 8 for example between about 4 and about 6 in the presence of urine and a protein or protein degradation product such as gelatin.

The enzymes used in the compositions of this invention are glucose aerodehydrogenase, sometimes known as glucose oxidase, which is capable of converting glucose to gluconic acid in the presence of atmospheric oxygen and at the same time forming hydrogen peroxide, a substance having peroxidase activity which is capable of oxidizing certain substances such as oxidisable dyes when it is present together with such dyes and hydrogen peroxide. Examples of such substances having peroxidase activity are peroxidase and catalase. Other substances which have catalytic activity such that they will cause the oxidation of oxidizable dyes in the presence of such dyes and hydrogen peroxide are exemplified by metalloporphyrine, e.g., hemin and uroferriprophyrin chloride, iodide-molybdate mixed salts such as sodium molybdate and potassium iodide mixed salts. In the place of potassium iodide and sodium molybdate other iodides such as sodium and ammonium iodides and other molybdates such as potassium and ammonium molybdates may also be used.

It has been found that other substances which exhibit catalytic activity so as to cause the oxidation of oxidizable dyes in the presence of hydrogen peroxide include normal whole blood, red blood cells alone, lyophilised whole blood and like substances.

In some instances a buffer composition may be included as above mentioned in order to keep the pH of the reactants at the site of reaction at a predetermined range.

The compositions of the present invention may be made into a suspension or a solution and used to impregnate a bibulous material such as paper or wood or other material having any desired shape or size; such a product after drying (although drying is not essential) will undergo a characteristic colour change when contacted with glucose-containing material, e.g., urine.

Alternatively, the compositions may be applied to or incorporated with splinters, sticks or strips made of, for example, wood, paper, cellulose derivatives such as cellulose acetate, glass, metal or plastic using gelatin or similar adhesive material for effecting adhesion. Such "sticks" will turn colour when moistened with a glucose-containing fluid.

The compositions may also be formed into tablets and used by applying the fluid to be tested to the tablet, e.g., placing a drop or two of suspect urine on the face of the tablet and observing the colour change, if any, which takes place.

There is a wide variability possible in the ratio of glucose oxidase and peroxidase or the substance having peroxidase-like activity which can be used in preparing the compositions of the invention; for example the glucose oxidase content can be increased by as much as one hundred times and decreased to even 1/10 of the amount described and still provide a functional testing device. And it is necessary only that there be sufficient oxidase to catalyse the oxidation of the glucose and enough substance having peroxidase or peroxidase-like activity so that it can exercise its own enzyme or enzyme-like activity.

A particularly important aspect of this invention is that it enables concentration of hydrogen peroxide to be determined quickly and in a roughly quantitative manner. We have found that a different quantitative response to hydrogen peroxide can be achieved in two ways:

(1) By a suitable choice of substrate, or
(2) In the case of a selected substrate, by varying the physical conditions in which it is used, for example by varying the concentrations of active ingredients, varying the pH and other suitable means.

While gelatine is a preferred proteinaceous material for producing the compositions of the present invention, other substances, including other proteins may be used, for example, dog plasma, dog serum, drief beef serum, bovine albumin and egg albumin. Casein and soluble starch (Merck) are also useful though generally to a more limited extent. And in general other soluble proteins, as well as plasma and serum can be used with some effectiveness as stabilizing agents to produce a stability effect similar though ordinarily to a lesser degree than that obtained by the use of gelatin.

Examples of substitutes that may be used for (preferably with) the gelatin specified are such products as the plastic spray known as "Spraint," soluble starch (Merck), bovine albumin, gum ghatti, rubber cement, egg albumin, casein, starch glycolate, plaster of Paris, glyptal (household glue), pectin, varnish such as that known commercially as "Cenco Label Varnish," potato starch and Canada balsam.

Generally speaking, it appears that any common adhesive material which does not contain glucose would be suitable for this purpose, and particularly so if used in combination with gelatin or other proteins.

We have further found that the use of boric acid allows the compositions of the invention to be used even in the presence of ascorbic acid.

The depth of colours produced when the compositions of the present invention are used to detect glucose is roughly proportional to the proportion of glucose present. Preferably, the compositions are used to test weakly acid urines. The compositions are capable of detecting glucose concentrations as low as 0.01% but the colour change is then slight and requires 15 to 30 seconds to develop.

The following examples illustrate the invention:

EXAMPLE 1

A mixture was prepared consisting of:

| | |
|---|---|
| Glucose oxidase | g 9.6 |
| Peroxidase | g 0.2 |
| Citric acid | g 14.8 |
| Sodium citrate | g 65.2 |
| Gelatin | g 9.6 |
| 3 methoxy 4 hydroxy benzal p-dimethylamino aniline | g 4.0 |
| Alcohol (95% ethanol) | ml 200 |
| Water, distilled | ml 600 | in the following manner:

(a) 9.6 g. of gelatin was added to 200 ml. of hot distilled water. The container was kept hot and stirred occasionally until the gelatin was dissolved. Prior to use, the gelatin was liquified and the temperature raised to 95° F.

(b) To 200 ml. of distilled water was added 14.8 g. of citric acid and 65.2 of sodium citrate and the mixture stirred until the solids dissolved.

(c) 4.0 g. of 3 methoxy 4 hydroxy benzal p-dimethyl-amino aniline was dissolved in the 200 ml. of alcohol and stirred just prior to the final mixing.

(d) Five to ten minutes before use, the peroxidase was dissolved in 200 ml. of distilled water with stirring, the glucose oxidase was added and stirred until dissolved.

(e) Final mixing. The gelatin solution (a) was poured into a stainless steel container and the buffer solution (b) was added rapidly with stirring. Next the 3 methoxy 4 hydroxy benzal p-dimethylamino aniline solution (c) was stirred in, any remaining in the beaker being rinsed out with the gelatin/buffer solution. Finally, the enzyme solution (d) was added with stirring until solution was complete.

*Preparation of reagent sticks*

Printed and die-cut strips of a filter paper were dipped into the impregnating solution, using racks, so that by the process of submersion and capillary attraction about half an inch of the strip at one end was completely impregnated.

The strips were then placed in a drying tunnel or in a forced air oven immediately, and dried at 100° C.

The resulting impregnated strips when dipped into urine or a solution containing glucose, give a mauve colour, the intensity and speed of development of which is roughly related to the proportion of glucose, providing inhibitors, such as gross amounts of antioxidants are not present.

EXAMPLE 2

Example 1 was repeated but using 4.0 grams of p-hydroxy benzal p-hydroxy aniline instead of 3 methoxy 4 hydroxy benzal p-dimethyl-amino aniline. In this case, when the impregnated strips are dipped into urine or a solution containing glucose, they give a brown colour, the intensity and speed of development of which is roughly related to the proportion of glucose, providing inhibitors are not present.

EXAMPLE 3

Example 1 was repeated but using 4.0 grams of a p-dimethyl amino benzal p-hydroxy aniline instead of 3 methoxy 4 hydroxy benzal p-dimethylamino aniline. In this case, when the impregnated strips are dipped into urine or a solution containing glucose, they give a brown colour, the intensity and speed of development of which is roughly related to the proportion of glucose, provdiing inhibitors are not present.

What we claim is:

1. A composition for detecting glucose in urine which comprises glucose oxidase, a substance having peroxidase activity and an indicator which is oxidized by hydrogen peroxide and peroxidase and undergoes colour reaction during such oxidation, said indicator being a compound of the formula:

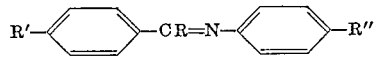

in which formula R' and R", which may be different, are substituents selected from the group consisting of hydroxyl radicals, amino radicals, NHR radicals and $NR_2$ radicals, in which radicals NHR and $NR_2$, R is a substituent selected from the group consisting of alkyl and aryl radicals, and wherein the benzene rings may contain other substituents, and salts thereof.

2. A composition according to claim 1 in which the indicator is the compound of the formula:

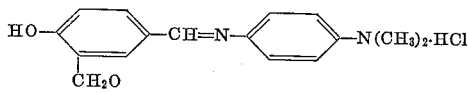

3. A composition according to claim 1 in which the indicator is the compound of the formula

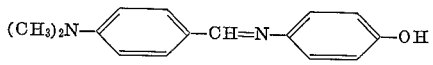

4. A composition according to claim 1 in which the indicator is the compound of the formula:

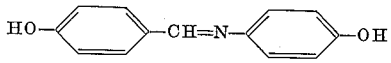

5. A composition according to claim 1 in which the substance having peroxidase activity is a member selected from the group consisting of peroxidase and catalase.

6. A composition according to claim 1 in which the substance having peroxidase activity is a member selected from the group consisting of the metalloporphyrine and a mixture of an iodide selected from the group consisting of sodium, potassium and ammonium salts with a molybdate selected from the group consisting of sodium, potassium and ammonium molybdates.

7. A composition for detecting glucose in urine which comprises glucose oxidase, a substance having peroxidase activity, an indicator which is oxidized by hydrogen peroxide and peroxidase and undergoes colour reaction during such oxidation, said indicator being a compound of the formula

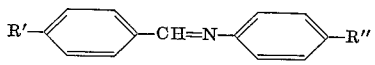

in which formula R′ and R″ which may be different, are substituents selected from the group consisting of hydroxyl radicals, amino radicals, NHR radicals and NR₂ radicals, in which radicals NHR and NR₂, R is a substituent selected from the group consisting of alkyl and aryl radicals, and wherein the benzene rings may contain other substituents and salts thereof, and a buffer for maintaining the pH of the mixture between 2 and 8 in the presence of urine and a protein or protein degradation product.

8. Indicator means for detecting glucose in urine comprising a bibulous material impregnated with a composition which comprises glucose oxidase, a substance having peroxidase activity and an indicator which is oxidized by hydrogen peroxide and peroxidase and undergoes colour reaction during such oxidation, said indicator being a compound of the formula:

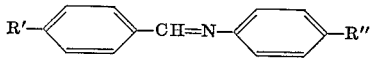

in which formula R′ and R″, which may be different, are substituents selected from the group consisting of hydroxyl radicals, amino radicals, NHR radicals and NR₂ radicals, in which radicals NHR and NR₂, R is a substituent selected from the group consisting of alkyl and aryl radicals, and wherein the benzene rings may contain other substituents, and salts thereof.

9. Indicator means for detecting glucose in urine comprising a solid carrier coated with a composition which comprises glucose oxidase, a substance having peroxidase activity and an indicator which is oxidized by hydrogen peroxide and peroxidase and undergoes colour reaction during such oxidation, said indicator being a compound of the formula:

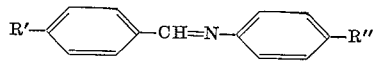

in which formula R′ and R″, which may be different, are substituents selected from the group consisting of hydroxyl radicals, amino radicals, NHR radicals and NR₂ radicals, in which radical R is a substituent selected from the group consisting of alkyl and aryl radicals, and wherein the benzene rings may contain other substituents, and salts thereof and an adhesive, said adhesive forming a bond between said composition and said solid carrier.

10. Indicator tablets for detecting glucose in urine comprising a composition which comprises glucose oxidase, a substance having peroxidase activity and an indicator which is oxidized by hydrogen peroxide and peroxidase and undergoes colour reaction during such oxidation, said indicator being a compound of the formula:

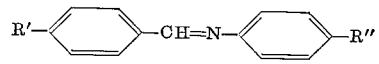

in which formula R′ and R″, which may be different, are substituents selected from the group consisting of hydroxyl radicals, amino radicals, NHR radicals and NR₂ radicals, in which radicals NHR and NR₂, R is a substituent selected from the group consisting of alkyl and aryl radicals, and wherein the benzene rings may contain other substituents, and salts thereof.

References Cited

UNITED STATES PATENTS

| | | | |
|---|---|---|---|
| 3,016,292 | 1/1962 | Bauer et al. | 195—103.5 |
| 3,233,974 | 2/1966 | Bradley | 252—408 |

MORRIS O. WOLK, *Primary Examiner.*

L. MEI, *Assistant Examiner.*